United States Patent [19]
Heyes et al.

[11] 3,876,655
[45] Apr. 8, 1975

[54] ANTI-INFLAMMATORY ACYL IMIDAZOLES

[75] Inventors: James Heyes, Peaslake; Neal Ward, Walton-on-the-Hill; Carl John Rose, London, all of England

[73] Assignee: Beecham Group Limited, Brentford, Middlesex, England

[22] Filed: Mar. 1, 1973

[21] Appl. No.: 337,062

Related U.S. Application Data
[63] Continuation-in-part of Ser. No. 211,687, Dec. 23, 1971, abandoned.

[30] Foreign Application Priority Data
Aug. 18, 1971 United Kingdom............. 38716/71

[52] U.S. Cl................................. 260/309; 424/273
[51] Int. Cl............................................ C07d 49/36
[58] Field of Search.................................. 260/309

[56] References Cited
UNITED STATES PATENTS
3,261,873 7/1966 Johnson et al..................... 260/309
3,772,319 11/1973 Heyes et al........................ 260/309

FOREIGN PATENTS OR APPLICATIONS
683,523 12/1952 United Kingdom................ 260/309

OTHER PUBLICATIONS
Kulev et al., Chemical Abstracts, Vol. 54, Col. 11000, (1960).
Gireva et al., Chemical Abstracts, Vol. 70, Abst. No. 28869j (1969).
Heyes et al., Chemical Abstracts, Vol. 76, Abst. No. 153744q, (1972).
Heyes et al., Chemical Abstracts, Vol. 78, Abst. No. 111321k, (1973), (Abst. of So. African Pat. No. 7300038).

*Primary Examiner*—John D. Randolph

[57] ABSTRACT

Compounds of the formula (II):

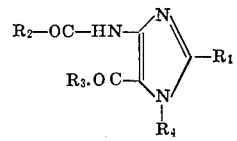

(II)

wherein
$R_1$ is unsubstituted or substituted aryl;
$R_2$ is hydrocarbon of 1 to 7 carbon atoms;
$R_3$ is amino; and
$R_4$ is hydrogen,
exhibit anti-inflammatory activity.

9 Claims, No Drawings

ANTI-INFLAMMATORY ACYL IMIDAZOLES

This application is a Continuation-in-part of application Ser. No. 211687 filed 23rd Dec. 1971 and now abandoned under the title "Anti-inflammatory acyl imidazoles."

This application relates to 5-acylamino-4-carboxamido-2-substituted imidazoles which compounds have been found to have benificial anti-inflammatory activity.

Copending U.S. Pat. application Ser. No. 174,258, now U.S. Pat. No. 3,772,319 granted Nov. 13, 1973 discloses the anti-inflammatory activity of certain imidazoles including inter alia those of formula (I):

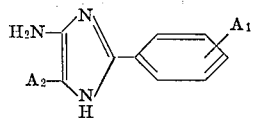
(I)

and its salts, wherein $A_1$ is hydrogen or halogen, carboxylic acid or an ester or amide thereof, nitro, trifluoromethyl, optionally substituted aryl, $C_{1-4}$ alkyl, hydroxyl or etherified or esterified hydroxyl, primary or secondary amino, acylated primary or secondary amino or tertiary amino and $A_2$ is optionally substituted phenyl or is carboxamido, carboxylic or optionally substituted ester.

It has been confirmed that compounds within formula (I) have anti-inflammatory activity of varying degrees. Although we now believe that such activity is most likely to have clinical significance in cases wherein $A_2$ is carboxamido or lower ester and $A_1$ is hydrogen, halogen, nitro or methyl.

It has now been found that certain modifications of an active group of the compounds (I) does not lead to loss of activity as might be expected, but can lead to a considerable enhancement in anti-inflammatory activity. The reason for the increase in activity is as yet uncertain. The present invention provides these compounds, each of which posses an acylated amino group on the imidazole ring.

Accordingly, the present invention provides compounds of the formula (II):

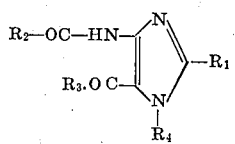
(II)

wherein $R_1$ is phenyl, halophenyl, nitrophenyl, toluyl, trifluoromethylphenyl, methoxyphenyl or naphthyl, alkylamino, dialkylamino or acylated amino; $R_2$ is a hydrocarbon of 1 to 7 carbon atoms; $R_3$ is amino; and $R_4$ is hydrogen.

Compounds of formula (II) wherein $R_4$ is hydrogen may exist in tautomeric forms. Such forms are included within this invention.

Compounds of formula (II) may form solvates. Such solvates are preferably hydrates. Solvates of compound of formula (II) are included within the invention.

When used in this specification the term "hydrocarbon" means an aliphatic, cycloaliphatic, or aromatic group or combinations of such groups containing only carbon and hydrogen atoms. "Aliphatic" means a straight or branched chained group which may contain one or two carbon to carbon double or triple bonds. "Cycloaliphatic" means a 3–7 carbon atom ring which when containing 6 carbon atoms may contain one or two carbon to carbon double bonds. "Aromatic" means phenyl or naphthyl. "Lower alkyl" means methyl, ethyl, propyl, butyl or benzyl. Lower alkyl means o-loweralkyl.

Suitable groups $R_2$ include methyl, ethyl, propyl, butyl, phenyl and benzyl. Methyl and ethyl are generally the more suitable groups $R_2$, the best activity usually being found when $R_2$ is methyl.

It is believed that the compounds of the invention having greatest anti-inflammatory activity are of formula (III):

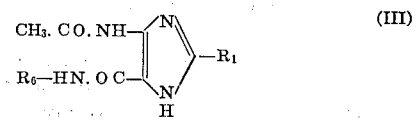
(III)

wherein $R_1$ is as previously defined and $R_6$ is hydrogen.

Thus one particularly suitable group of compounds of the invention are those of formula (IV):

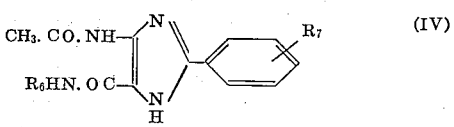
(IV)

where $R_7$ is hydrogen, halogen, nitro, methyl, trifluoromethyl or methoxyl and $R_6$ is hydrogen. We believe that the compounds of formula (IV) of greatest activity are those wherein $R_7$ is selected for hydrogen or halogen, the compounds wherein $R_7$ is hydrogen or a p-fluorine being preferred.

Suitable compounds of formulas (II) and (III) wherein $R_1$ is not phenyl, substituted phenyl, naphthyl or substituted naphthyl include those wherein $R_1$ is a group selected from aralkyl or 7–12 carbon atoms of 1–12 carbon atoms cycloaliphatic of 3–7 carbon atoms or one of the proceeding groups substituted by a halogen atom.

We believe that a further particularly suitable group of compounds of the invention are those of formula (V):

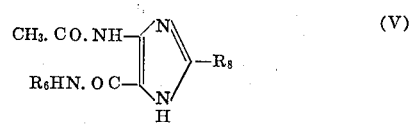
(V)

wherein $R_8$ is selected from aliphatic hydrocarbon of 1–6 carbon atoms, aliphatic hydrocarbon of 1–6 carbon atoms substituted by a phenyl or cycloaliphatic hydrocarbon.

Of the compounds of formula (V), those of greatest activity include those wherein $R_8$ is ethyl, propyl, iso-pentyl or benzyl and $R_6$ is hydrogen.

In a further aspect the invention provides a process for the preparation of compounds of general formula II which process comprises the acylation of a compound of formula (VI):

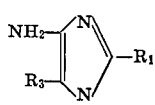

with an acylating derivative of an acid of general formula HO.CO.R$_2$ wherein R$_1$, R$_3$ and R$_4$ are as above defined.

By an acylating derivative of an acid HO.CO.R$_2$ is meant the acid itself or such derivatives as acid halides, (for example, the acid chloride or the acid bromide), the acid anhydride or a mixed anhydride, or a derivative made in situ by reaction with a dehydrating agent such as, for example, a carbodiimide such as dicyclohexyl carbodiimide.

The reaction may be carried out by any conventional method of acylation.

Suitable solvents for the process include such solvents as halogenated hydrocarbons such as chloroform, methylene chloride and the like polar solvents such as dimethylformamide or dimethylsulphoxide, basic solvents such as pyridine and the like or any other such conventional solvent.

Low, ambient or high temperature may be used depending upon the nature of the acylating agent, the group R$_2$ and the pH of the solution. For example, if an acid chloride Cl.CO.R$_2$ in pyridine is used, then the reaction would normally be carried out at ambient or low (e.g., 0°C) temperature; however if milder reagents such as the acid anhydride in chloroform were used, a high temperature, (e.g., reflux temperature) might be employed.

If it is desired to form a compound wherein both the exocyclic and an endocyclic nitrogen atom is acylated the more severe acylating conditions listed above are, for example refluxing in pyridine for 2 hrs. with an anhydride.

Compound which may be prepared using one of the above processes include:

5-Acetamido-4-carboxamido-2-phenylimidazole.
5-Acetamido-4-carboxamido-2-(p-fluorophenyl)imidazole.
5-Acetamido-4-carboxamido-2-(m-fluorophenyl)imidazole.
5-Acetamido-4-carboxamido-2-(p-methylphenyl)imidazole.
5-Acetamido-4-carboxamido-2-(o-chlorophenyl)imidazole.
5-Acetamido-4-carboxamido-2-(m-chlorophenyl)imidazole.
5-Acetamido-4-carboxamido-2-(p-methoxyphenyl)imidazole.
5-Propionamido-4-carboxamide-2-phenylimidazole.
5-Propionamido-4-carboxamide-2-(p-fluorophenyl)imidazole.
5-Propionamido-4-carboxamide-2-(m-methylphenyl)imidazole.
5-Propionamido-4-carboxamide-2-p-nitrophenyl)imidazole.
5-Pivaloylamido-4-carboxamide-2-(p-fluorophenyl)imidazole.

In a further aspect the invention provides a pharmaceutical composition comprising a compound of general formula (II) together with one or more pharmaceutically acceptable excipients, diluents or carriers.

The active compound may be present in the formulation as a salt or as the free base, either of which may be hydrated.

The compositions of the invention may be formulated in unite dosage forms to be administered orally (for example for pill, capsules, solutions, tablets and the like) parenterally (for example by injection of a solution in a sterile water) or by suppositiory. Such dosage forms will normally contain from 25mgs. to 500mgs., and may be administered from, for example, 1 to 12 times daily, a suitable daily dose for a 70 kg adult being from 250–2,500 mgs.

The compound of formula (VI) may be prepared by a method similar to that reported in Patent application No. 174253 and comprises the reaction of a nitrile of formula (VII) with a salt of a thioiminoether of formula (VIII).

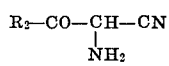 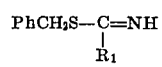

The following Examples serve to illustrate the invention.

EXAMPLE 1

5-Acetamido-4-carboxamido-2-(4'-fluorophenyl) imidazole

5-Amino-4-carboxamido-2-(4'-fluorophenyl) imidazole (2.0g) was dissolved in pyridine (5 ml) and acetic anhydride (1g) in pyridine (5 ml) was slowly added. After working up by conventional methods the crude product was obtained. Recrystallisation from ethanol yielded 5-Acet-amido-4-carboxamido-2-(4'fluorophenyl) imidazole (500 mg) m.p. 228°C.

EXAMPLE 2

5-Acetamido-4-carboxamido-2-phenyl imidazole

5-Amino-4-carboxamido-2-phenyl imidazole (2.0 gm) in pyridine (20 mls) was warmed with acetic anhydride (1.5 ml).

Evaporation of the solvents and recrystallisation from ethanol yielded 5-acetamido-4-carboxamido-2-phenyl imidazole (1.2g) m.p. 216°C.

EXAMPLE 3–5

5-Propionamido-4-carboxamido-2-(4'-fluorophenyl) imidazole

5-Amino-4-carboxy-2-(4'fluorophenyl) imidazole (2g) in pyridine (20 mls) was heated to reflux with propionic anhydride (2.0 ml). Evaporation of the solvents and recrystallisation from ethanol gave 5-propionamido-4-carboxamido-2-(4'fluorophenyl) imidazole (600 mg) m.p. 194°C.

In an analogous manner were prepared 5-pivaloylamido-4-carboxamido-2-(4'-fluorophenyl) imidazole, m.p. 180°C

EXAMPLE 6

5-Acetamido-4-carboxamido-2-(4'-chlorophenyl) imidazole

5-Amino-4-carboxamido-2-(4'-chlorophenyl) imidazole (1.0 g) was allowed to stand in pyridine (4 mls) and acetic anhydride (1 ml) for one hour. The solution was poured into water and the resulting precipitate filtered off and recrystallised from water to yield 5-acetamido-4-carboxamido-2-(4'-chlorophenyl) imidazole (600 mg), m.p. > 198°C.

EXAMPLES 7-9

By processes analogous to that described in Example 6 were prepared the following compounds:

| EXAMPLE NO. | COMPOUND | m.p.°C. |
|---|---|---|
| 7 | 5-Pivaloylamido-4-carboxamido-2-(4'-fluorophenyl) imidazole. | 180 |
| 8 | 5-n-Heptanoylamido-4-carboxamido-2-(4'-fluorophenyl) imidazole. | 146 |
| 9 | 5-n-Heptanoylamido-4-carboxamido-2-phenyl imidazole. | |

[Compounds of Examples 7 and 8 were recrystallised from ethanol, that of Example 9 was recrystallised from ethanol/water].

EXAMPLE 10

Compounds of the invention were shown to posses anti-inflammatory activity by the "Mouse Ear Test" of Brown et. al., Nature, 202, 812-3 (1964).

The following doses were required to reduce the inflammation by approximately 50 percent ($ED_{50}$):

| COMPOUND | $ED_{50}$ (mg/kg) |
|---|---|
| 5-Acetamido-4-carboxamido-2-(4'-fluorophenyl) imidazole | ~ 50 |
| 5-Acetamido-4-carboxamido-2-phenylimidazole | ~ 75 |

What is claimed is:

1. A compound of the formula:

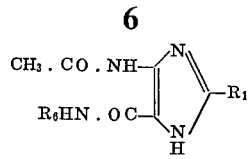

wherein $R_1$ is phenyl, halophenyl, nitrophenyl, toluyl, trifluoromethylphenyl, methoxyphenyl or naphthyl and $R_6$ is hydrogen.

2. A compound according to claim 1 of the formula:

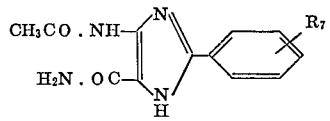

where $R_7$ is hydrogen, halogen, nitro, methyl, trifluoromethyl or methoxyl.

3. A compound according to claim 2 wherein $R_7$ is hydrogen or p-fluorine.

4. A compound according to claim 3 of the formula (V):

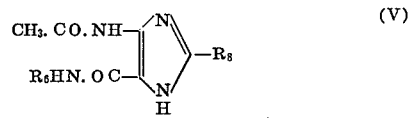

wherein $R_8$ is an alkyl group of 1-6 carbon substituted by phenyl or aliphatic hydrocarbon of 1-12 carbon atoms which may contain carboxyclic ring of 3-7 atoms.

5. A compound according to claim 4 wherein $R_8$ is a ethyl, propyl, isopentyl or benzyl.

6. A compound according to claim 2 wherein $R_7$ is hydrogen or halogen.

7. The compound according to claim 1 which is 5-acetamido-4-carboxamido-2-(4'-fluorophenyl) imidazole.

8. The compound according to claim 1 which is 5-acetamido-4-carboxamido-2-phenyl imidazole.

9. The compound according to claim 1 which is 5-acetamido-4-carboxamido-2-(4'-chlorophenyl) imidazole.

* * * * *